United States Patent
Morita

(10) Patent No.: US 9,311,033 B2
(45) Date of Patent: Apr. 12, 2016

(54) IMAGE PROCESSING APPARATUS SYSTEM FOR STORING AND RETRIEVING SETTING INFORMATION

(71) Applicants: KABUSHIKI KAISHA TOSHIBA, Tokyo (JP); TOSHIBA TEC KABUSHIKI KAISHA, Tokyo (JP)

(72) Inventor: Hiroaki Morita, Izunokuni Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/454,532

(22) Filed: Aug. 7, 2014

(65) Prior Publication Data

US 2016/0041801 A1    Feb. 11, 2016

(51) Int. Cl.
*G06K 15/00* (2006.01)
*G06F 3/12* (2006.01)

(52) U.S. Cl.
CPC ............ *G06F 3/1258* (2013.01); *G06F 3/1205* (2013.01); *G06F 3/1222* (2013.01)

(58) Field of Classification Search
CPC .... G06F 3/1258; G06F 3/1205; G06F 3/1222
USPC .......... 358/1.1, 1.13, 1.14, 1.15, 402
See application file for complete search history.

(56) References Cited

U.S. PATENT DOCUMENTS

| | | | |
|---|---|---|---|
| 8,094,329 B2 | 1/2012 | Hirama | |
| 8,452,194 B2* | 5/2013 | Nakagawa | 399/8 |
| 2012/0164944 A1* | 6/2012 | Yamaoka et al. | 455/41.1 |
| 2012/0307287 A1* | 12/2012 | Motosugi | 358/1.14 |
| 2013/0016395 A1* | 1/2013 | Akutsu | 358/1.15 |
| 2013/0347098 A1* | 12/2013 | Maeda et al. | 726/17 |

* cited by examiner

*Primary Examiner* — Gabriel Garcia
(74) *Attorney, Agent, or Firm* — Patterson & Sheridan, LLP

(57) ABSTRACT

An image processing apparatus according to an embodiment includes an authentication unit that authenticates a user and logs in the user when the user is authenticated. An input unit receives an input from the user indicating a setting of a function of the image processing apparatus. A setting management unit causes a storage unit to store setting information corresponding to the setting indicated by the input from the user, while the user is logged in, and to store the setting information when the user logs out. A setting state control unit retrieves the setting information of the user and sets a setting state of the image processing apparatus according to the retrieved setting information when the authentication unit logs in the user.

15 Claims, 8 Drawing Sheets

IMAGE PROCESSING APPARATUS SYSTEM FOR STORING AND RETRIEVING SETTING INFORMATION

BACKGROUND

In a copying machine or a multifunction peripheral that includes a copying machine, which is used by a plurality of users, authentication of a user needs to be performed. For example, each user may use the copying machines or multifunction printer only after performing a login.

However, the copying machine or the multifunction peripheral described above is at a previously set state when a user performs a login to use the copying machine or the multifunction peripheral. Therefore, when a user performs a login to perform the same operation as when the user was previously logged in, a re-setting of the copying machine or the multifunction printer has to be performed in some cases.

DETAILED DESCRIPTION

An image processing apparatus according to an embodiment includes an authentication unit that authenticates a user and logs in the user when the user is authenticated. An input unit receives an input from the user indicating a setting of a function of the image processing apparatus. A setting management unit causes a storage unit to store setting information corresponding to the setting indicated by the input from the user, while the user is logged in, and to store the setting information when the user logs out. A setting state control unit retrieves the setting information of the user and sets a setting state of the image processing apparatus according to the retrieved setting information when the authentication unit logs in the user.

Hereinafter, the embodiment will be described with referring to drawings.

First Embodiment

Figure 1:
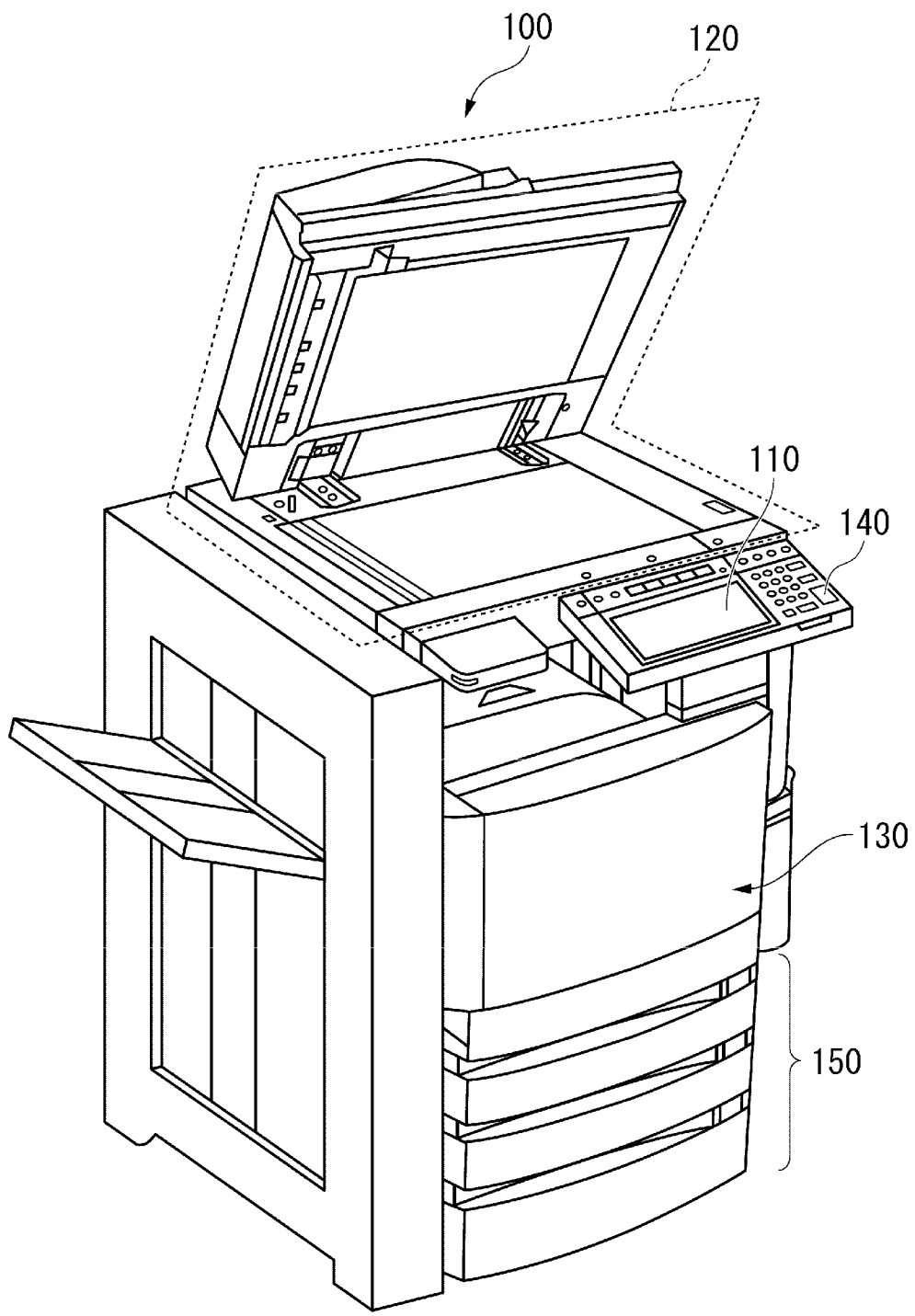
FIG. 1 is an external view illustrating an example of an image processing apparatus, according to a first embodiment.

FIG. 1 is an external view illustrating an example of an image processing apparatus 100 according to a first embodiment. The image processing apparatus 100 may be configured as an image forming device (for example, a copying machine, printer, or facsimile machine) which forms an image and outputs the image on a sheet. The image processing apparatus 100 may be, for example, a scanner which performs image processing on an input image. The image processing apparatus 100 may be a multifunction printer (MFP) which includes a copying machine function, a printer function, a scanner function, a facsimile function and the like. In the following description, a case in which the image processing apparatus 100 is an MFP will be described as an example.

The image processing apparatus 100 reads a sheet to generate digital data. For example, a sheet read by the image processing apparatus 100 is paper or a film having a manuscript, a character, a picture, and the like. The sheet read by the image processing apparatus 100 may be anything that the image processing apparatus 100 is capable of reading. In addition, the image processing apparatus 100 prints an image or a character corresponding to digital data on a sheet such as printing paper. The image processing apparatus 100 includes a touch panel 110, an image reading device 120 (image reading unit), a printing unit 130 (image forming unit), a control panel 140, and a paper tray 150.

Figure 2:
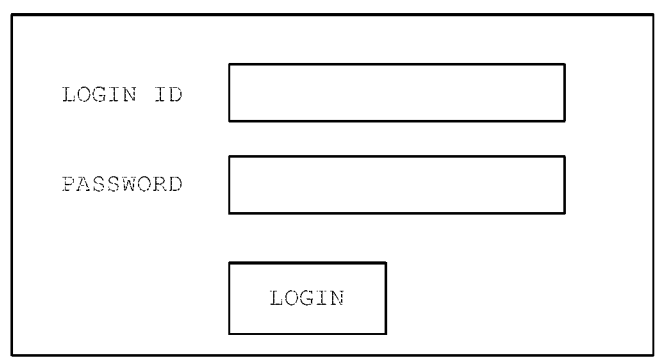
FIG. 2 illustrates an example of a login screen, according to the first embodiment.

Each of a plurality of users performs a login operation so that the image processing apparatus 100 can be used by the user who logs in. FIG. 2 illustrates a display example of a login screen displayed on the touch panel 110. The touch panel 110 integrally includes a display unit for displaying information and an input unit for receiving an operation input. The login screen receives input of a user ID (identification information of the user) and a password (authentication information of the user) for a user authentication. When the user ID and the password are input by the user and a login button is pressed, the image processing apparatus 100 receives the user ID and the password. Then, the image processing apparatus 100 performs user authentication using the received user ID and password. The image processing apparatus 100 allows an authenticated user to log in to the image processing apparatus 100. After authentication, the authenticated user may use the image processing apparatus 100.

Moreover, the touch panel 110 receives an operation input from the user regarding a function or a setting of the image processing apparatus 100, while logged in. For example, the touch panel 110 receives an operation input for selecting a function that a user uses among the copying machine function, the printer function, the scanner function, the facsimile function and the like. Moreover, the touch panel 110 receives an operation input for selecting a type, a size or the like of a sheet to print using the copying machine function or the printer function. In addition, the touch panel 110 receives an operation input for selecting or inputting a transmission destination to perform a transmission using the facsimile function. Moreover, the touch panel 110 receives an operation input for logging out from a state of being logged in.

The control panel 140 includes a mechanical operation button, and receives an operation input from the user with respect to the operation button. For example, the control panel 140 includes a power button for turning on/off power of the image processing apparatus 100, and receives an operation input with respect to the power button. In addition, the control panel 140 includes a number key (numeric keypad) for inputting a number, and receives an operation input with respect to the number key. For example, the control panel 140 receives an operation input which sets the number of sheets to print using the copying machine function or the printer function.

Figure 3:
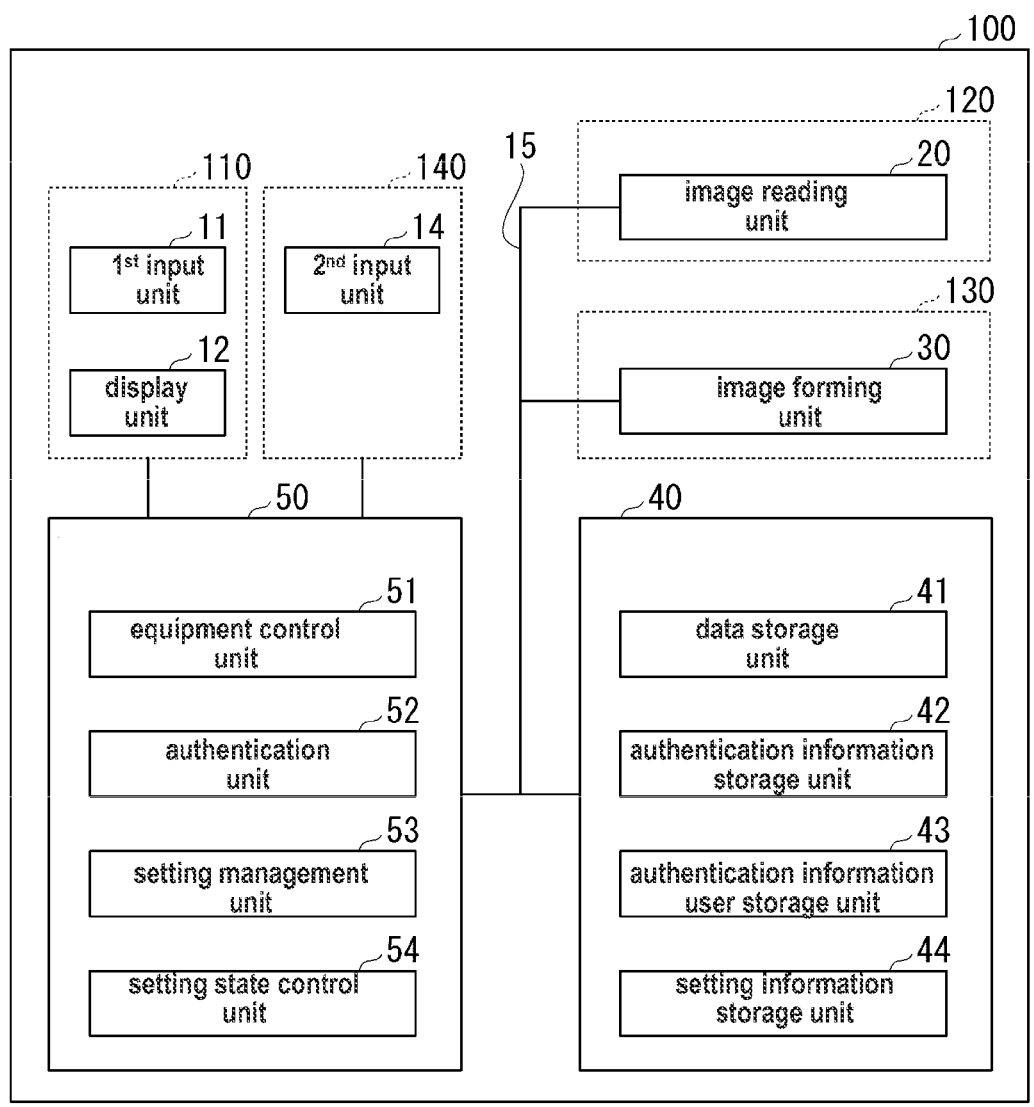
FIG. 3 is a block diagram illustrating an example configuration of the image processing apparatus, according to the first embodiment.

FIG. 3 is a block diagram illustrating an example of the configuration of the image processing apparatus 100 according to the first embodiment. The image processing apparatus 100 includes a first input unit 11, a display unit 12, a second input unit 14, an image reading unit 20, an image forming unit 30, a storage unit 40, and a control unit 50. Respective units included in the image processing apparatus 100 are connected to each other by the internal bus 15, and exchange data with each other through the internal bus 15.

The first input unit 11 and the display unit 12 are integrally configured as the touch panel 110 which receives an operation input from a user. The first input unit 11 is an input device which detects a contact on a screen of the display unit 12 and receives an operation input of a user. For example, the first input unit 11 receives a setting regarding a function of the image processing apparatus 100 by an operation input of a user with respect to the touch panel 110. Moreover, when receiving the operation input of a user, the first input unit 11 supplies input information corresponding to the received operation input to the control unit 50. The display unit includes a liquid crystal display, an organic Electro-Luminescence (EL) display, or the like which displays information such as images and characters.

The second input unit 14 is an input device which receives an operation input from the control panel 140. For example, the second input unit 14 receives the setting regarding the function of the image processing apparatus 100 by an operation input of a user from the control panel 140. In addition, when receiving an operation input from a user, the second input unit 14 supplies input information corresponding to the received operation input to the control unit 50.

The image reading unit 20 includes a Contact Image Sensor (CIS) or a sensor such as a Charge Coupled Device (CCD). The image reading unit 20 reads a sheet on which a manuscript, a character, or a picture is disclosed using a sensor, and generates corresponding digital data. The image reading unit 20 is included in the image reading device 120 illustrated in FIG. 1.

The image forming unit 30 prints the images or characters corresponding to the digital data on a sheet such as printing paper. A printing method of the image forming unit 30 may included fixing a toner image, for example. An ink jet method or other image forming methods may also be used to perform printing. The image forming unit 30 is included in the printing unit 130 illustrated in FIG. 1.

The storage unit 40 includes a recording medium such as a flash ROM, and Hard Disk Drive (HDD) or a combination thereof. The storage unit 40 stores a program, data, various types of information, and the like for controlling each unit included in the image processing apparatus 100. For example, the storage unit 40 includes a data storage unit 41, an authentication information storage unit 42, an authentication user information storage unit 43, and a setting information storage unit 44.

The data storage unit 41 stores various types of information and data necessary for performing each function such as the copying machine function, the printer function, the scanner function, and the facsimile function. For example, the data storage unit 41 stores information representing a function selected by an operation of a user in the image processing device 100, a type or a size of a sheet to print, the number of sheets to print, and the like. In addition, the data storage unit 41 stores digital data which is generated by the reading of a sheet by the image reading unit 20. Moreover, the data storage unit 41 stores digital data received by the facsimile function when the image processing apparatus 100 performs the facsimile function. For example, the image forming unit 30 may print an image or a character corresponding to the digital data stored in the data storage unit 41.

In addition, the data storage unit 41 stores initial state information which represents an initial state of the image processing apparatus 100 set in advance. For example, when the image processing apparatus 100 is started first after a factory shipment, a setting state of the image processing apparatus is stored as the initial state information.

The authentication information storage unit 42 stores authentication information of a user which allows a user to use the image processing apparatus 100. For example, the authentication information storage unit 42 stores, as authentication information, a user ID and password of a user who is allowed to use the image processing apparatus 100. The user ID and password are stored in association with each other.

The authentication user information storage unit 43 stores user information of a user who is authenticated and allowed to log in to the image processing apparatus 100. For example, the authentication user information storage unit 43 stores the user ID of the user during the login. It is possible to specify the user during a login by a user ID stored in the authentication user information storage unit 43.

In addition, the authentication user information storage unit 43 may store a user ID of a user, and flag information which represents whether or not a login is being performed, in association with each other. For example, the authentication user information storage unit 43 may store the user ID of a user who logs in and the flag information which represents that a login was performed, in association with each other. Moreover, when the user logs out, the authentication user information storage unit 43 may store the user ID of the user and information which represents that a login is not being performed, in association with each other. Similarly, when the user logs out, the authentication user information storage unit 43 stores the user ID of the user and information which represents that a logout is being performed, in association with each other.

The setting information storage unit 44 stores setting state information which represents a setting state of the image processing apparatus 100. For example, the setting state of the image processing apparatus 100 includes information which represents which function of the copying machine function, the printer function, the scanner function, the facsimile function, and the like is selected. In addition, the setting state includes information regarding a type or a size of a sheet to print by the copying machine function or the printer function, or the number of sheets to print. In addition, the setting state includes a transmission destination to transmit to by the facsimile function. The setting information storage unit 44 stores a user ID of a user using the image processing apparatus 100 and setting state information which represents the setting state of the image processing apparatus 100 set by the user in association with each other.

The control unit 50 includes a central processing unit (CPU) which functions as a control center of the image processing apparatus 100, a dedicated processor, or the like. The control unit 50 controls each unit included in the image processing apparatus 100. For example, the control unit 50 includes an equipment control unit 51, an authentication unit 52, a setting management unit 53, and a setting state control unit 54.

The equipment control unit 51 causes the copying machine function, the printer function, the scanner function, the facsimile function and the like to be performed by controlling an operation of each unit included in the image processing apparatus 100. For example, the equipment control unit 51 controls an operation of each unit according to a function selected by an operation input of the user. In addition, the equipment control unit 51 controls an operation of each unit according to information set by an operation input of the user. More specifically, the equipment control unit 51 controls a reading operation by an image reading unit 20 according to the operation input of the user. In addition, the equipment control unit 51 controls a storing of digital data generated by the image reading unit 20 in the data storage unit 41. In addition, the equipment control unit 51 controls reading of the digital data from the data storage unit 41 or printing of the read digital data to the image forming unit 30.

The equipment control unit 51 acquires a function selected and information set by an operation input of the user by input information provided to the control unit 50 from the first input unit 11 or the second input unit 14. In addition, the equipment control unit 51, based on the acquired input information, causes information which represents a function and a setting selected the user to be stored in the data storage unit 41 and updates the information at any time.

The authentication unit 52 performs a user authentication for a user who intends to use the image processing apparatus 100. Thereby, an authenticated user is allowed to log in to the image processing apparatus 100. For example, the authentication unit 52 acquires input information including a user ID and password input in a login screen (FIG. 2) through the first input unit 11 as authentication information of the user. Then, the authentication unit 52 performs a user authentication by comparing the acquired authentication information with authentication information stored in the authentication information storage unit 42. When the acquired authentication information accords with the authentication information stored in the authentication information storage unit 42, the authentication unit 52 allows the user to login to the image processing apparatus 100. Accordingly, the user may use the image processing apparatus 100. Moreover, at this time, the authentication unit 52 causes user information of the authenticated user (for example, user ID) to be stored in the authentication user information storage unit 43. On the other hand, the authentication unit 52 does not allow a user to log in to the image processing apparatus 100 when the acquired authentication information does not accord with the authentication information stored in the authentication information storage unit 42.

In addition, when acquiring input information representing a logout through the first input unit 11, the authentication unit 52 causes the user who is logged in to be logged out. Accordingly, a user who was previously logged is no longer able to use the image processing apparatus 100. In addition, at this time, the authentication unit 52 erases a user ID of the user who was previously allowed to log in, which is stored in the authentication user information storage unit 43 (for example, referred to as "null").

The setting management unit 53 causes setting state information for each authenticated user to be stored in the setting information storage unit 44. The setting state information represents a setting state regarding a function of the image processing apparatus 100 when a user is logged in. For example, when a user logs out, the setting management unit 53 causes setting state information (which represents a setting state immediately before the logout) to be stored in the setting information storage unit 44. More specifically, the setting management unit 53 causes the user ID of the authenticated user and the setting state information immediately before logout to be stored in the setting information storage unit 44 in association with each other. That is, the setting management unit 53 stores the user ID of the user and the setting state information in the setting information storage unit 44 in association with each other.

When a user is allowed to log in by the authentication unit 52, the setting state control unit 54 refers to the setting state information stored in the setting information storage unit 44. Then, the setting state control unit 54 sets the image processing apparatus 100 to a setting state corresponding to setting state information previous stored in association with the user ID of the authenticated user. For example, when a user is allowed to log in by the authentication unit 52, the setting state control unit 54 sets the setting state of the image processing apparatus 100 to a setting state immediately before a preceding logout of the authenticated user. Accordingly, when a user logs in again after logging out, the image processing apparatus 100 may restore the setting state immediately before the preceding logout. Thus, according to the embodiment, when a user logs in to perform the same operation as a previous operation, it is unnecessary for the user to reset desired settings of the image processing apparatus 100. Therefore, it is possible to improve an operability of the user.

Next, restoring processing in which the image processing apparatus restores a setting state at a time of a preceding login will be described with referring to FIGS. 4 and 5.

Figure 4:
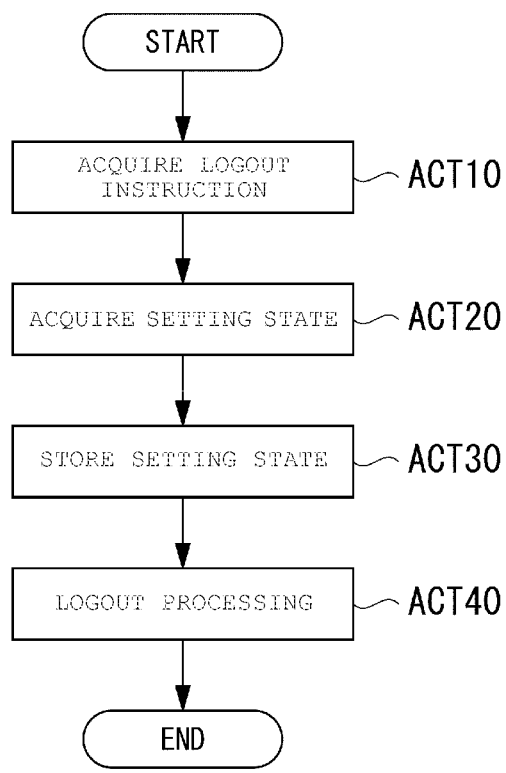
FIG. 4 is a flowchart illustrating example operations for saving a setting state, according to the first embodiment.

FIG. 4 is a flowchart illustrating example operations for saving a setting state, according to the embodiment. First, an operation procedure for saving the setting state of the image processing apparatus 100 immediately before a logout, at the time of the logout, will be described with referring to FIG. 4.

First, in a state when the user is logged in the image processing apparatus 100, the user performs an operation for a logout with respect to the touch panel 110. The authentication unit 52 acquires the input information which instructs a logout through the first input unit 11 (ACT10).

After acquiring the input information which instructs a logout, the authentication unit 52 notifies the setting management unit 53 of the acquired information. The setting management unit 53 acquires a current setting state—such as a function, a setting, and the like of the image processing apparatus 100 used by the user-from the data storage unit 41 (ACT20). Then, the setting management unit 53 stores setting state information, which represents the acquired setting state, and the user ID of the user who is currently logged in the setting information storage unit 44, in association with each other (ACT30). Accordingly, the setting management unit 53 saves the setting state immediately before the logout of each user.

When storing the setting state information in the setting information storage unit 44, the setting management unit 53 notifies the authentication unit 52 of the stored information. The authentication unit 52 performs logout processing and causes a user who logs in to be logged out from the image processing apparatus 100 (ACT40).

Figure 5:
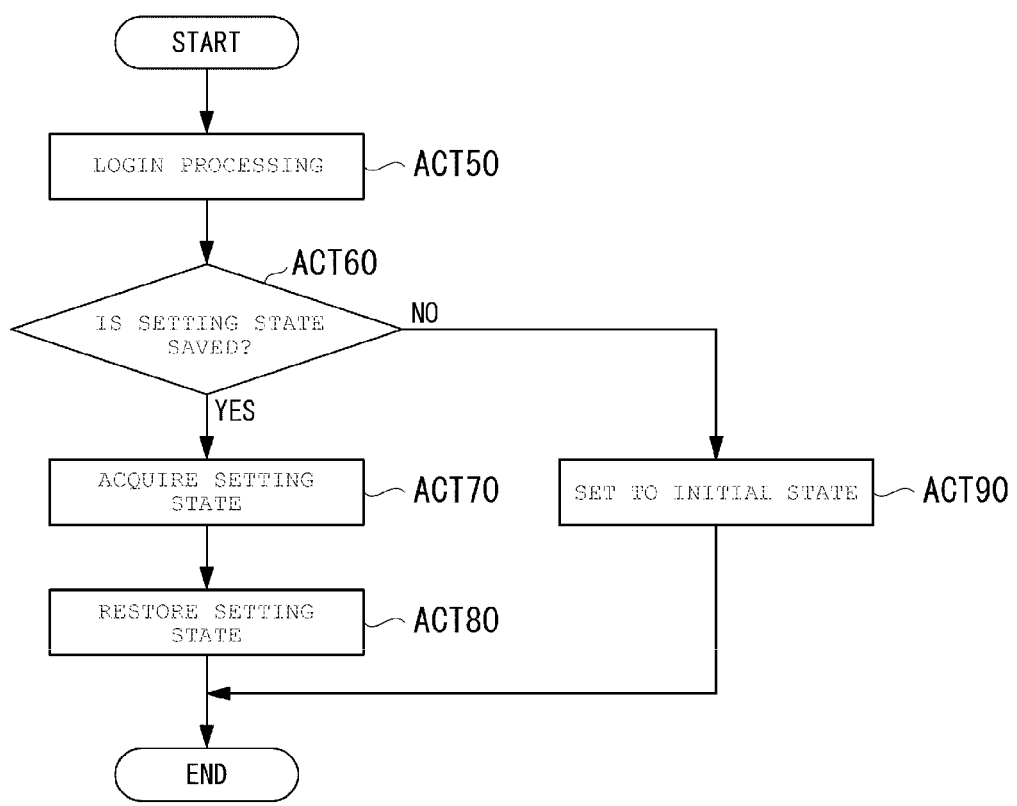
FIG. 5 is a flowchart illustrating example operations for restoring the setting state, according to the first embodiment.

FIG. 5 is a flowchart illustrating example operations for restoring a setting state, according to the embodiment. Next, an operation procedure for restoring a setting state of the image processing apparatus 100 at a time when the user logs in to a setting state from immediately before the user's preceding logout will be described with referring to FIG. 5.

First, in a state of logout from the image processing apparatus 100, a user performs a login operation with respect to the touch panel 110. The authentication unit 52 acquires authentication information of the user (user ID and password) through the first input unit 11. The authentication unit 52 performs user authentication by comparing the acquired authentication information with authentication information of a user who is allowed to use the image processing apparatus 100, which is stored in the authentication information storage unit 42. Then, when the acquired authentication information accords with the authentication information stored in the authentication information storage unit 42, the authentication unit 52 allows the user to log in to the image processing apparatus 100 (ACT50).

Next, the setting state control unit 54 refers to setting state information stored in the setting information storage unit 44.

Then, the setting state control unit 54 determines whether or not setting state information corresponding to the authenticated user is stored. That is, the setting state control unit 54 determines whether or not the setting state information corresponding to the authenticated user has been previously saved (ACT60).

When it is determined that the setting state information corresponding to the authenticated user is saved (ACT60: Yes), the setting state control unit 54 acquires the setting state information corresponding to the authenticated user from the setting information storage unit 44 (ACT70). Then, the setting state control unit 54 restores a setting state of the image processing apparatus 100 to a setting state represented by the acquired setting state information (ACT80).

On the other hand, when it is determined that the setting state information corresponding to the authenticated user is not saved (ACT60: No), the setting state control unit 54 sets the setting state of the image processing apparatus 100 to an initial state (ACT90).

Accordingly, when the user logs in, the image processing apparatus 100 according to the embodiment may restore the setting state from when the user previously logged in. Therefore, when a user logs in after logging out, resetting the image processing apparatus 100 may be unnecessary. Therefore, according to the image processing apparatus 100 of the embodiment, it is possible to improve an operability of a user.

For example, when an authenticated user logs out, the setting management unit 53 stores setting state information, which represents a setting state immediately before the logout, in the setting information storage unit 44.

In other words, the image processing apparatus 100 may save a last setting state that was set before the user logs out.

Moreover, the setting management unit 53 stores a user ID (identification information) of an authenticated user and setting state information of the user in the setting information storage unit 44, in association with each other. Accordingly, the image processing apparatus 100 may manage the setting state of the image processing apparatus 100 for each user when each user logs in.

In the embodiment described above, an example in which the image processing apparatus 100 restores a previous setting state immediately before a preceding logout when the user logs in again is described. The image processing apparatus 100 is not limited to the example, but may restore a setting state which has a high setting frequency based on a setting state immediately before a plurality of times the authenticated user logs out in the past. In addition, the image processing apparatus 100 may restore a setting state which has a high setting frequency during a login based on a setting state when the user is allowed to log in.

Second Embodiment

Next, a second embodiment will be described. In the second embodiment, a configuration in which a saving destination of a setting state is set to an external storage device will be described.

Figure 6:
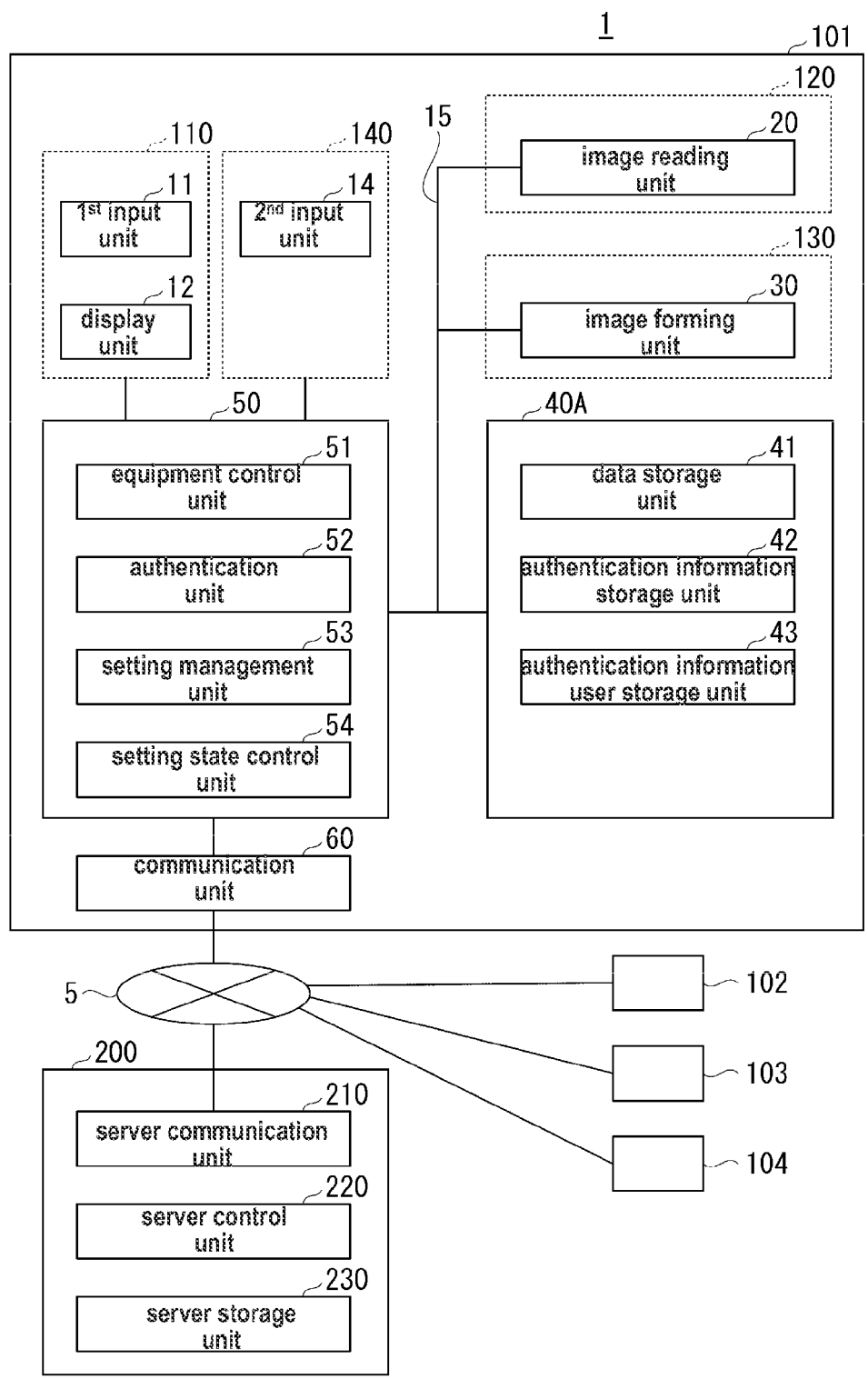
FIG. 6 is a block diagram illustrating an example configuration of an image processing apparatus system, according to a second embodiment.

FIG. 6 is a block diagram illustrating an example of the configuration of the image processing apparatus system 1 according to a second embodiment. The image processing apparatus system 1 includes a plurality of image processing apparatuses (for example, image processing apparatuses 101, 102, 103, and 104), and a server 200. Each of the plurality of image processing apparatuses 101, 102, 103, and 104 is connected to the server 200 in a communicable manner through a network 5. The network 5 is an information communication network such as the internet, or a Local Area Network (LAN).

The server 200 is an example of an external storage device provided separately from the plurality of image processing apparatuses 101, 102, 103, and 104. The server 200 includes a server communication unit 210, a server control unit 220, and a server storage unit 230. The server communication unit 210 communicates with each of the plurality of image processing apparatuses 101, 102, 103, and 104. The server control unit 220 causes the server storage unit 230 to store information received by the server communication unit 210. In addition, the server control unit 220 transmits the information stored in the server storage unit 230 to the plurality of image processing apparatuses 101, 102, 103, and 104 through the server communication unit 210.

The server storage unit 230 stores the information acquired from each of the plurality of image processing apparatuses 101, 102, 103, and 104. For example, the server storage unit 230 stores setting state information acquired from each of the plurality of image processing apparatuses 101, 102, 103, and 104. The setting state information is setting state information described in the first embodiment. The server storage unit 230 stores the setting state information acquired from each of the plurality of image processing apparatuses 101, 102, 103, and 104 and a user ID in association with each other. That is, the server storage unit 230 corresponds to the setting information storage unit 44 included in the image processing apparatus 100 according to the first embodiment.

In the following description, the image processing apparatuses 101, 102, 103, and 104 have the same configuration, respectively. The image processing apparatus 101 will be described as an example when not particularly distinguished.

A configuration of the image processing apparatus 101 is the same as the configuration of the image processing apparatus 100 illustrated in FIG. 3 except that the image processing apparatus 101 includes the communication unit 60 and does not include the setting information storage unit 44. The image processing apparatus 101 includes a first input unit 11, a display unit 12, a second input unit 14, an image reading unit 20, an image forming unit 30, a storage unit 40A, a control unit 50, and the communication unit 60. In this drawing, the same reference numeral is applied to the same configuration as in FIG. 3, and the description thereof is omitted.

The storage unit 40A includes the data storage unit 41, the authentication information storage unit 42, and the authentication user information storage unit 43, but does not include the setting information storage unit 44 illustrated in FIG. 3. The communication unit 60 communicates with the server 200 through the network 5.

In the image processing apparatus system 1 according to the embodiment, the image processing apparatus 101 saves the setting state corresponding to each user in the server 200. That is, the setting management unit 53 of the image processing apparatus 101 stores setting state information which represents a setting state of each user in the server storage unit 230 of the server 200, through the network 5. In addition, the setting state control unit 54 of the image processing apparatus 101 acquires the setting state information which represents a setting state of each user from the server storage unit 230 of the server 200 through the network 5.

In this manner, the server 200 saves the setting state information which represents a setting state of each user of the image processing apparatus system 1. Accordingly, a plurality of image processing apparatuses 101, 102, 103, and 104 may share a setting state for each user in each image processing apparatus. Therefore, the image processing apparatus system 1 may restore a setting state from when a user previously logged in even though the user later logs in using any of the image processing apparatuses. For example, the image processing apparatus system 1 may restore a setting state from a time of a logout by a user using the image processing apparatus 101 when the user logs in using another image processing apparatus 102. Therefore, even if the user logs in again using any of the image processing apparatuses after a logout, the user starts an operation using a setting state previously set. That is, the user may operate using any of the plurality of image processing apparatuses without performing setting operations again.

Next, restoring processing in which the image processing apparatus system 1 restores a setting state when a user has logged in previously, according to the second embodiment, will be described. The operation procedure for saving a setting state according to the second embodiment is different from the an operation of ACT30 in the operation procedure illustrated in FIG. 4. In ACT30, the setting management unit 53 transmits setting state information, which represents a current setting state, to the server 200 by associating with a user ID of the user who is currently logged in.

In an operation procedure for restoring a setting state according to the second embodiment, operations of ACT60 and ACT70 in the operation procedure illustrated in FIG. 5 are different from in the first embodiment. In ACT60, the setting state control unit 54 refers to the setting state information stored in the server storage unit 230. Then, the setting state control unit 54 determines whether or not the setting state information corresponding to the authenticated user is stored. When it is determined that the setting state information is saved (ACT60: Yes), the setting state control unit 54 acquires setting state information representing the setting state from the server storage unit 230 (ACT70).

The authentication unit 52 allows an authenticated user to log in to the image processing apparatus by performing a user authentication. The setting management unit 53 transmits setting state information (representing a setting state when the image processing apparatus was previously used) during a login to the server 200 through the network 5 for each authenticated user. The setting state control unit 54 refers to the setting state information stored in the server 200 when a login is allowed by the authentication unit 52. Then, the setting state control unit 54 sets the setting state of the image processing apparatus to a setting state represented by setting state information corresponding to the authenticated user.

In addition, the server 200 includes the server communication unit 210 and the server storage unit 230. The server communication unit 210 receives setting state information transmitted from each of the plurality of image processing apparatuses (101 and the like) through the network 5. The server storage unit 230 stores the setting state information received by the server communication unit 210.

As described above, in the image processing apparatus system 1 according to the embodiment, the server 200 saves setting state information representing a setting state of each user. Accordingly, the image processing apparatus system 1 may share a setting state of each user among the plurality of image processing apparatuses (101 and the like). Therefore, the image processing apparatus system 1 may restore a setting state from when a user was previously logged in even though the user later logs in using any image processing apparatus.

For example, when an authenticated user logs out, the setting management unit 53 of the image processing apparatus 101 transmits setting state information which represents a setting state immediately before the logout to the server 200. Moreover, when a login is allowed by the authentication unit 52, the setting state control unit 54 refers to predetermined setting state information among the setting state information stored in the server 200. The predetermined setting state information is setting state information transmitted from an image processing apparatus from which the authenticated user logs out last among the plurality of image processing apparatuses (101 and the like). Then, the setting state control unit 54 sets a setting state of the image processing apparatus to a setting state represented by the predetermined setting state information.

Accordingly, the image processing apparatus system 1 may allow a user to start an operation using a setting state previously set by the user even though the user logs in using any of the other image processing apparatuses. Therefore, the user may perform an operation using any of the plurality of image processing apparatuses without performing setting operations again.

Any of the plurality of image processing apparatuses (101 and the like) may be configured to function as the server storage unit 230 of the server 200. That is, any of the plurality of image processing apparatuses (101 and the like) may be configured to function as the server 200.

Moreover, in an example illustrated in FIG. 6, four image processing apparatuses 101, 102, 103, and 104 are included, but the number of image processing apparatuses is not limited thereto.

Third Embodiment

Next, a third embodiment will be described.

In the image processing apparatus system 1 illustrated in FIG. 6, a portion or all of the plurality of image processing apparatuses (101 and the like) may include the setting information storage unit 44 illustrated in FIG. 3. Then, one or both of the internal setting information storage unit 44 and the external server storage unit 230 of the image processing apparatus 101 may store setting state information which represents a setting state.

For example, the image processing apparatus 101 may select one of the internal setting information storage unit 44 and the external server storage unit 230 as a saving destination of the setting state information. As an example, the image processing apparatus 101 may store setting state information in the external server storage unit 230 when communication is established with the server 200. On the other hand, the image processing apparatus 101 may store the setting state information in the internal setting information storage unit 44 when communication with the server 200 has failed.

Figure 7:
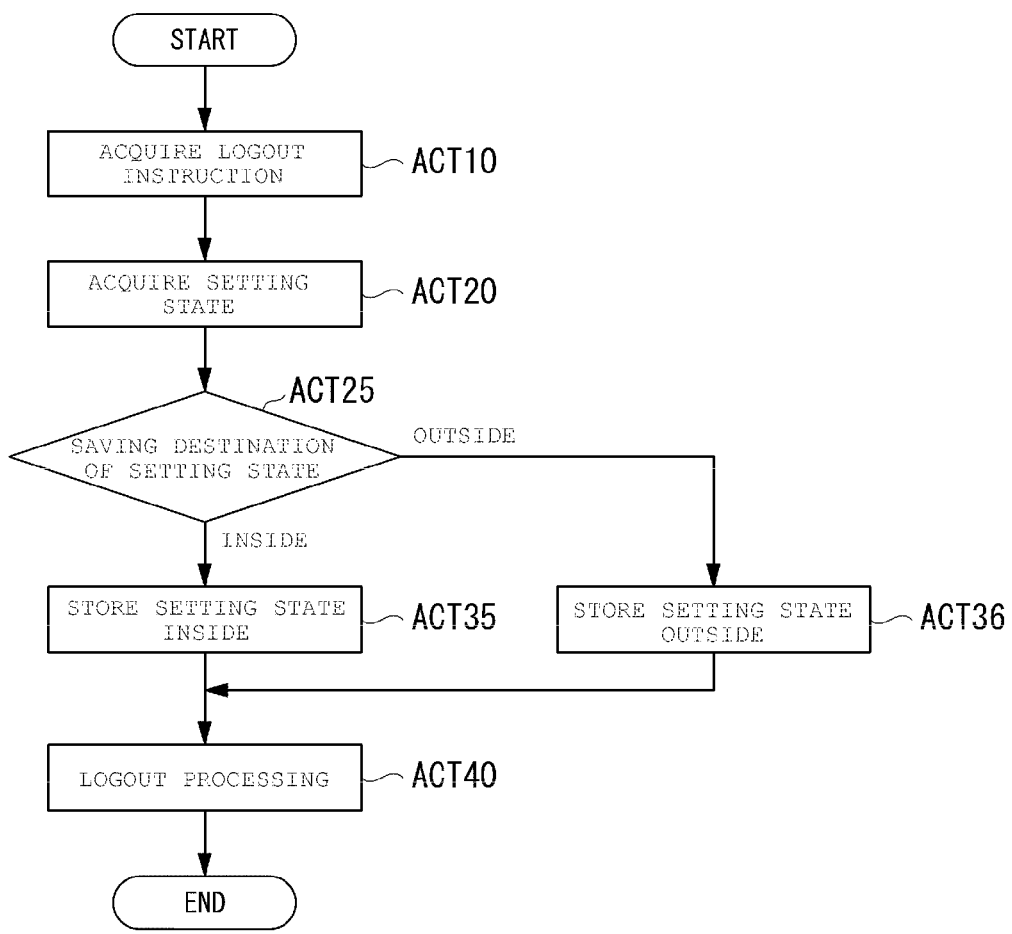
FIG. 7 is a flowchart illustrating example operations for saving a setting state, according to a third embodiment.

FIG. 7 is a flowchart illustrates example operations for saving a setting state according to the third embodiment. FIG. 7 illustrates an example of the operation procedure in which an internal storage unit or an external storage unit of the image processing apparatus 101 saves a setting state. In FIG. 7, the same reference numeral is applied to the same operation as in FIG. 4, so that the description thereof is omitted.

When acquiring a current setting state of the image processing apparatus 100 (ACT20), the setting management unit 53 determines a saving destination of setting state information representing the acquired setting state (ACT25). When the saving destination is determined to be inside (ACT25: inside), the setting management unit 53 causes the acquired setting state information to be stored in the setting information storage unit 44, in association with the user ID (ACT35). Thereafter, the authentication unit 52 performs logout processing and causes the authenticated user to be logged out from the image processing apparatus 100 (ACT40).

On the other hand, when the saving destination is determined to be outside (ACT25: outside), the setting management unit 53 transmits the acquired setting state information to the server 200, in association with a user ID (ACT36). The server control unit 220 of the server 200 acquires setting state information and the user ID through the server communication unit 210. The server control unit 220 causes the acquired setting state information and the user ID to be stored in the server storage unit 230 in association with each other. Afterwards, the authentication unit 52 performs logout processing and causes the user to be logged out from the image processing apparatus 100 (ACT40).

Figure 8:
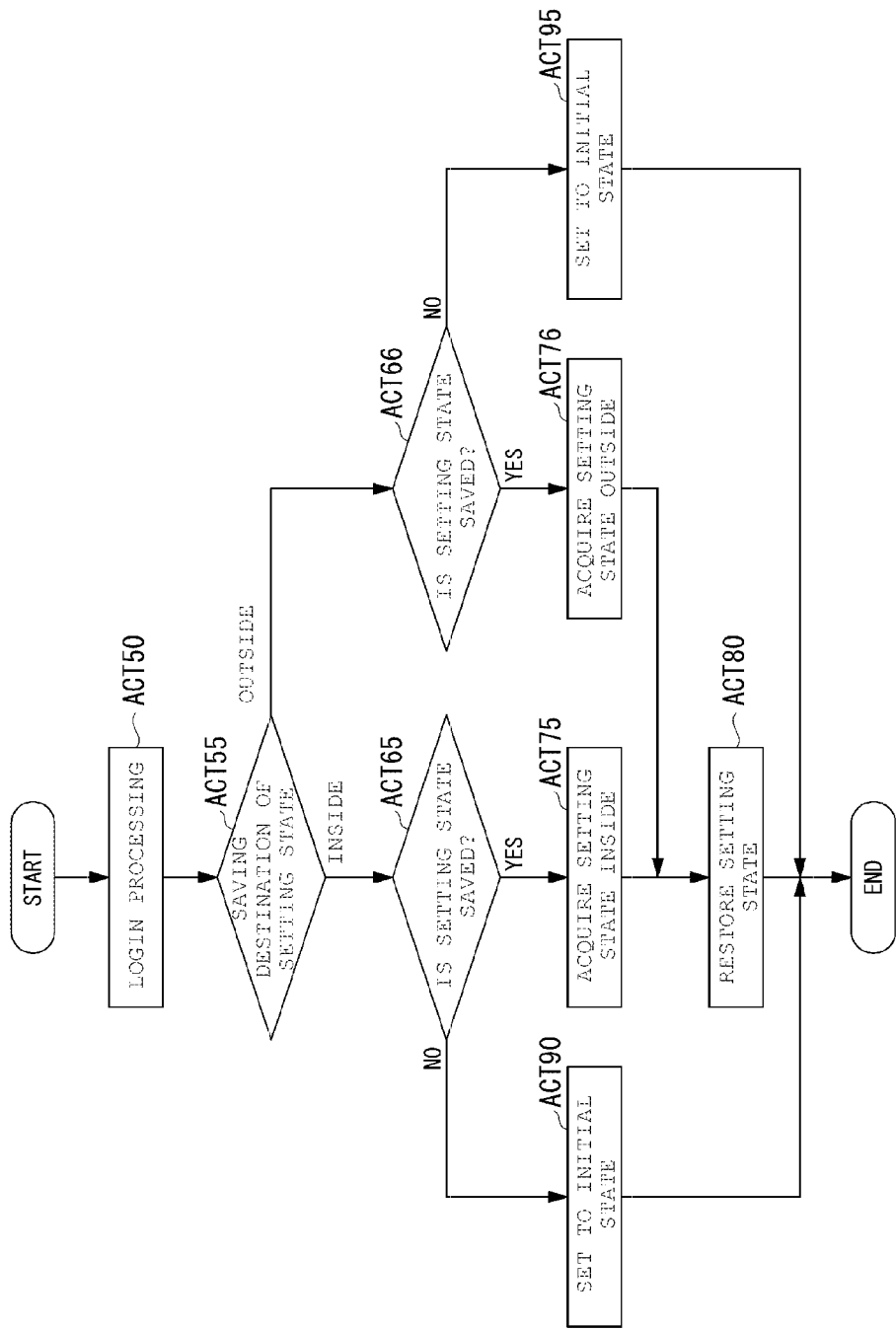
FIG. 8 is a flowchart illustrating example operations for restoring the setting state, according to the third embodiment.

FIG. 8 is a flowchart illustrating example operations for restoring a setting state according to the third embodiment. FIG. 8 illustrates an example of operation procedures for restoring the setting state of the image processing apparatus to a setting state saved by an internal storage unit or an external storage unit of the image processing apparatus 101. In FIG. 8, the same reference numerals are applied to the same operations as in FIG. 5, and the description thereof will not be described.

When the authentication unit 52 allows a user to log in to the image processing apparatus 100 (ACT50), the setting state control unit 54 determines a saving destination of setting state information which represents a setting state (ACT55). When it is determined that the saving destination of the setting state information is inside (ACT55: inside), the setting state control unit 54 determines whether or not the setting state information corresponding to the authenticated user is saved in the setting information storage unit 44 (ACT65). When it is determined that the setting state information corresponding to the authenticated user is saved in the setting information storage unit 44 (ACT65: Yes), the setting state control unit 54 acquires the setting state information from the setting information storage unit 44 (ACT75). Then, the setting state control unit 54 restores a setting state of the image processing apparatus 100 to a setting state represented by the acquired setting state (ACT80). On the other hand, when it is determined that the setting state information corresponding to the authenticated user is not saved in the setting information storage unit 44 (ACT65: No), the setting state control unit 54 sets the setting state of the image processing apparatus 100 to an initial state (ACT90).

On the other hand, when it is determined that a saving destination of the setting state information is outside (ACT55: outside), the setting state control unit 54 determines whether or not the setting state information corresponding to the authenticated user is saved in the server storage unit 230 (ACT66). When it is determined that the setting state information corresponding to the authenticated user is saved in the server storage unit 230 (ACT66: Yes), the setting state control unit 54 acquires the setting state information from the server storage unit 230 (ACT76). Then, the setting state control unit 54 restores the setting state of the image processing apparatus 100 to a setting state represented by the acquired setting state (ACT80). On the other hand, when it is determined that the setting state information is not saved in the server storage unit 230 (ACT66: No), the setting state control unit 54 sets the setting state of the image processing apparatus 100 to the initial state (ACT95).

As described above, in the image processing apparatus system according to the embodiment, each of a plurality of image processing apparatuses (101 and the like) includes the setting information storage unit 44 illustrated in FIG. 3. Then, the setting management unit 53 of each of the plurality of image processing apparatuses selects a saving destination of setting state information as either the server storage unit 230 of the server 200 and the setting information storage unit 44 of the image processing apparatus.

Accordingly, the image processing apparatus system 1, according to the third embodiment, may switch a saving destination of setting state information between outside and inside according to the communication state of the network 5. For example, each of the plurality of image processing apparatuses (101 and the like) may save setting state information inside when communication with the server 200 has failed. Then, each of the plurality of image processing apparatuses (101 and the like) may transmit setting state information so that the setting state information is saved in the server 200 when communication with the server 200 is established.

In addition, when a login is allowed by the authentication unit 52, the setting state control unit 54 selects a storage unit as either the server storage unit 230 of the server 200 or the setting information storage unit 44 of the image processing apparatus. Next, the setting state control unit 54 refers to the setting state information stored in the selected storage unit. Then, the setting state control unit 54 sets the setting state of the image processing apparatus to a setting state represented by the setting state information corresponding to the authenticated user.

Accordingly, the image processing apparatus system 1 may switch a reference destination of setting state information between outside and inside according to a communication state of the network 5. For example, each of the plurality of image processing apparatuses (101 and the like) refers to the setting state information inside and restores a setting state when communication with the server 200 has failed.

According to the image processing apparatus 100 of at least one of the embodiments described above, when a user logs in, it is possible to restore a setting state from when the user was previously logged in and authenticated. Therefore, it is possible to improve an operability of a user.

In further embodiments, an authentication server that is disposed external to the image processing apparatus may perform the functions of the authentication information storage unit 42 in the image processing apparatus 100. In addition, other types of user authentication may be used in the embodiments. For example, an IC card may be used as an alternative to the manual inputting of user ID and password.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
a processor configured as:
an authentication unit that authenticates a user and logs in the user when the user is authenticated,
an input unit that receives an input from the user indicating a setting for performing an image processing function of the image processing apparatus,
a setting management unit that causes a storage unit to store setting information corresponding to the setting indicated by the input from the user when the user logs out, and
a setting state control unit that retrieves the setting information of the user and sets a setting state of the image processing apparatus for performing the image processing function according to the retrieved setting information when the authentication unit logs in the user, wherein the storage unit is selected by the setting management unit from one of an internal storage unit and an external storage unit, based on a communication status between the image processing apparatus and the external storage unit.

2. The apparatus according to claim 1, wherein, when the authenticated user logs out, the setting management unit causes the storage unit to store the setting state information representing the setting state immediately before the authenticated user logs out.

3. The apparatus according to claim 2, wherein, when the authentication unit authenticates and logs in the user, the setting state control unit sets the setting state of the image processing apparatus to a setting state corresponding to setting information stored immediately before a preceding logout of the user.

4. The apparatus according to claim 1, wherein the setting management unit causes the storage unit to store identification information of the authenticated user in association with the setting information corresponding to the setting indicated by the input from the user.

5. The apparatus according to claim 1, wherein the storage unit stores setting information for each of a plurality of authenticated users.

6. An image processing apparatus system comprising:
a plurality of image processing apparatuses; and
a storage device connected to each of the plurality of image processing apparatuses through a network, wherein:
each of the plurality of image processing apparatuses includes a processor configured as:
an authentication unit that authenticates a user and logs in the user when the user is authenticated,
an input unit that receives an input from the user indicating a setting for performing an image processing function of the image processing apparatus,
a setting management unit that transmits to the storage device setting information corresponding to the setting indicated by the input from the user and stores the setting information when the user logs out, and
a setting state control unit that retrieves the setting information of the user from the storage device and sets a setting state of the image processing apparatus for performing the image processing function according to the retrieved setting information when the authentication unit logs in the user, and
the storage device includes:
a communication unit configured to receive the setting information transmitted from each of the plurality of image processing apparatuses through the network, and
a storage unit that stores the setting information received by the communication unit, wherein the storage unit is selected by the setting management unit from one of an internal storage unit and an external storage unit, based on a communication status between the image processing apparatus and the external storage unit.

7. The system according to claim 6, wherein, when the authenticated user logs out of one of the plurality of image forming apparatuses, the setting management unit of one of the plurality of image forming apparatuses causes the storage unit to store the setting state information representing the setting state immediately before the authenticated user logs out.

8. The system according to claim 7, wherein, when the authentication unit of one the plurality of image forming apparatuses authenticates and logs in the user, the setting state control unit of the one of the plurality of image forming apparatuses sets the setting state of the one of the plurality of image forming apparatuses to a setting state corresponding to setting information stored immediately before a preceding logout of the user.

9. The system according to claim 6, wherein the setting management unit of each of the plurality of image forming apparatuses causes the storage unit to store identification information of the authenticated user in association with the setting information corresponding to the setting indicated by the input from the user.

10. The system according to claim 6, wherein the storage unit stores setting information for each of a plurality of authenticated users.

11. An image processing method comprising the steps of:
authenticating a login event corresponding to a user identification;
receiving a setting for performing an image processing function of an image processing apparatus;
causing a storage unit to store setting information corresponding to the setting at a logout event; and
retrieving the setting information and setting a setting state of the image processing apparatus for performing the image processing function according to the retrieved setting information, when a new login event corresponding to the user identification is authenticated, wherein
the storage unit is selected from one of an internal storage unit and an external storage unit, based on a communication status between the image processing apparatus and the external storage unit.

12. The method according to claim 11, wherein, when the authenticated user logs out, the setting management unit causes the storage unit to store the setting state information representing the setting state immediately before the authenticated user logs out.

13. The method according to claim 12, wherein, when the user is authenticated and logged in, the setting state of the image processing apparatus is set to a setting state corresponding to setting information stored immediately before a preceding logout of the user.

14. The method according to claim 11, wherein identification information of the authenticated user is stored in association with the setting information corresponding to the setting indicated by the input from the user.

15. The method according to claim 11, further comprising:
causing the storage unit to store setting information for each of a plurality of authenticated users.

* * * * *